(12) United States Patent
Zagara et al.

(10) Patent No.: US 8,595,111 B2
(45) Date of Patent: *Nov. 26, 2013

(54) SYSTEM AND METHOD FOR REGULATING ORDER ENTRY IN AN ELECTRONIC TRADING ENVIRONMENT

(71) Applicant: Trading Technologies International, Inc., Chicago, IL (US)

(72) Inventors: Thomas R. Zagara, La Grange, IL (US); Scott F. Singer, Lake Bluff, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/742,538

(22) Filed: Jan. 16, 2013

(65) Prior Publication Data
US 2013/0166432 A1    Jun. 27, 2013

Related U.S. Application Data

(63) Continuation of application No. 13/463,990, filed on May 4, 2012, now Pat. No. 8,380,598, which is a continuation of application No. 13/160,866, filed on Jun. 15, 2011, now Pat. No. 8,195,548, which is a continuation of application No. 12/911,968, filed on Oct. 26, 2010, now Pat. No. 7,991,668, which is a continuation of application No. 12/486,577, filed on Jun. 17, 2009, now Pat. No. 7,853,504, which is a continuation of application No. 11/170,938, filed on Jun. 30, 2005, now Pat. No. 7,577,600.

(51) Int. Cl.
*G06Q 40/00*    (2012.01)

(52) U.S. Cl.
USPC ............................................................ 705/35

(58) Field of Classification Search
None
See application file for complete search history.

(56) References Cited

U.S. PATENT DOCUMENTS

| | | | |
|---|---|---|---|
| 6,098,051 | A | 8/2000 | Lupien et al. |
| 6,408,282 | B1 | 6/2002 | Buist |
| 6,772,132 | B1 | 8/2004 | Kemp, II et al. |
| 6,850,907 | B2 | 2/2005 | Lutnick et al. |
| 7,035,819 | B1 | 4/2006 | Gianakouros et al. |
| 7,085,738 | B2 | 8/2006 | Tarrant |

(Continued)

OTHER PUBLICATIONS

Maidenberg, H. J.; Commodities; Lead, Zinc Welcome Winter; New York Times; Dec. 1, 1980; D.7.*

(Continued)

*Primary Examiner* — Virpi Kanervo
(74) *Attorney, Agent, or Firm* — McDonnell Boehnen Hulbert & Berghoff LLP

(57) ABSTRACT

A system and method are provided for defining slop parameters to an individual spread order or a customized group of orders. The system and method may be used to, for example, define inside slop, outside slop, and/or adjustable range parameters to one or more orders. The inside slop, outside slop, and/or adjustable range parameters may be input by a trader, and, among other things, allow a trader to prioritize orders, set parameters so that some orders are re-priced more aggressively than other spread orders. Alternatively, slop parameters associated with a spread order may also apply more restrictive slop parameters to orders within the same adjustable range. Slop parameters associated with a spread order can also be configured and modified by a trader based on the trader's preferences. Other features and advantages are described herein.

11 Claims, 10 Drawing Sheets

(56) References Cited

U.S. PATENT DOCUMENTS

| | | | |
|---|---|---|---|
| 7,113,924 | B2 | 9/2006 | Fishbain |
| 7,127,424 | B2 | 10/2006 | Kemp, II et al. |
| 7,251,629 | B1 * | 7/2007 | Marynowski et al. ......... 705/37 |
| 7,389,268 | B1 | 6/2008 | Kemp, II et al. |
| 7,426,487 | B2 * | 9/2008 | Glinberg et al. ............... 705/35 |
| 7,437,325 | B2 | 10/2008 | Kemp, II et al. |
| 7,577,600 | B1 | 8/2009 | Zagara et al. |
| 7,590,576 | B1 | 9/2009 | Zagara et al. |
| 7,596,528 | B1 | 9/2009 | Herz |
| 7,848,991 | B1 | 12/2010 | Buck |
| 7,853,504 | B1 | 12/2010 | Zagara et al. |
| 7,904,370 | B2 | 3/2011 | Singer et al. |
| 7,991,668 | B2 | 8/2011 | Zagara et al. |
| 8,195,548 | B2 | 6/2012 | Zagara et al. |
| 2003/0236737 | A1 | 12/2003 | Kemp, II et al. |
| 2004/0193526 | A1 | 9/2004 | Singer et al. |
| 2005/0203826 | A1 | 9/2005 | Farrell et al. |
| 2011/0040677 | A1 | 2/2011 | Zagara et al. |
| 2011/0246352 | A1 | 10/2011 | Zagara et al. |
| 2012/0221459 | A1 | 8/2012 | Zagara et al. |

OTHER PUBLICATIONS

Chapman, Peter; Net Trading Under Fire: Riskless Principal Rule Could Crimp Margins; Traders Magazine; Sep. 1, 2000; p. 1.*

Salcedo, Yesenia; Spreads for the Fall; Futures; 33.11; Sep. 2004; pp. 54-57.*

Chaput, J.S., and Ederington, L.H., "Option Spread and Combination Trading," *The Journal of Derivatives*, Summer 2003, vol. 10, No. 4, pp. 70-88.

Chen, D-H. and Blenman, L.P., "An Extended Model of Serial Covariance Bid-Ask Spreads" [online], *International Journal of Business and Economics*, Taichung: 2003, vol. 2, Iss. 1, pp. 75-83. [Retrieved on Mar. 3, 2011] from the Internet: http://proquest.umi.com, ProQuest Document ID: 1887288491.

Butterworth, D. and Holmes, P., "Inter-Market Spread Trading: Evidence From UK Index Futures Markets", *Applied Financial Economics*, 2002, vol. 12, pp. 783-790.

Dey, M.K., "Essays on Information Asymmetry and Microstructure on Equity Markets," (Abstract) [online], University of Massachusetts Amherst, 2001, p. 1. [Retrieved on Sep. 14, 2011] from the Internet: hitp://proquest.umi.com/, ProQuest Document ID: 728444631.

Faille, C., "Write More about Risk, Less about Classic Rock, Please" [online], *Daily News*, White Plains, NY, Sep. 21, 2004, p. 1. [Retrieved on Sep. 14, 2011] from the Internet: http://proquest.umi.com/, ProQuest Document ID: 778362391.

"HKEx: HKEx Seeks Market Views on Proposed Changes in Trading Parameters and Other Settings" [online] *M2 Presswire*, Coventry: Jan. 21, 2005, p. 1. . [Retrieved on Mar. 3, 2011] from the Internet: http://proquest.umi.com/, ProQuest Document ID: 781886531.

Maidenberg, H.J., "Futures/Options; Municipal Index A Success" [online], *New York Times*, Jul. 8, 1985, pp. 8-D.8. [Retrieved on Sep. 26, 2012] from the Internet: http://proquest.umi.com/, ProQuest Document ID: 425474671.

Nematnejad, A., "The Ted Spread Trade: Illustration of the Analytics Using Bloomberg," YieldCurve.com, 2003, pp. 1-10.

Simons, H.L., "No Margin for Error" [online], *Futures*, vol. 28, Iss. 2, Feb. 1999, pp. 46-48. [Retrieved on Sep. 26, 2012] from the Internet: http://proquest.umi.com/, ProQuest Document ID: 235281985.

Taylor, N., "Trading Intensity, Volatility, and Arbitrage Activity," *Journal of Banking and Finance*, vol. 28, 2004, pp. 1137-1162.

Valeva, A.K., "On the Bid-ask Spread in Asymmetric Information Models," (Abstract) [online], University of California, Santa Barbara, 2002, p. 1. [Retrieved on Sep. 14, 2011] from the Internet: http://proquest.umi.com/, ProQuest Document ID: 765131251.

Zhao, F., "Essays on Empirical Term Structure Modeling," Cornell University, Ph.D. Dissertation, 2003, pp. 1-130.

* cited by examiner

SYSTEM AND METHOD FOR REGULATING ORDER ENTRY IN AN ELECTRONIC TRADING ENVIRONMENT

CROSS-REFERENCE TO RELATED APPLICATIONS

The present application is a continuation of U.S. patent application Ser. No. 13/463,990, filed May 4, 2012, now U.S. Pat. No. 8,380,598, and entitled "System and Method for Regulating Order Entry in an Electronic Trading Environment," which is a continuation of U.S. patent application Ser. No. 13/160,866, filed Jun. 15, 2011, now U.S. Pat. No. 8,195,548, and entitled "System and Method for Regulating Order Entry in an Electronic Trading Environment," which is a continuation of U.S. patent application Ser. No. 12/911,968, filed Oct. 26, 2010, now U.S. Pat. No. 7,991,668, and entitled "System and Method for Regulating Order Entry in an Electronic Trading Environment," which is a continuation of U.S. patent application Ser. No. 12/486,577, filed Jun. 17, 2009, now U.S. Pat. No. 7,853,504, and entitled "System and Method for Regulating Order Entry in an Electronic Trading Environment," which is a continuation of U.S. patent application Ser. No. 11/170,938, filed Jun. 30, 2005, now U.S. Pat. No. 7,577,600, and entitled "System and Method for Regulating Order Entry in an Electronic Trading Environment," the contents of which are fully incorporated herein by reference.

FIELD OF THE INVENTION

The present invention is directed towards electronic trading. Specifically, the present invention is directed to tools for trading tradeable objects that can be traded with quantities and/or prices.

BACKGROUND

Electronic trading includes a host exchange that has a central computer in which bids and offers are received and executed, if a match exists between them. The host exchange provides a summary of the bids and offers for viewing by those traders that have access to the system. The traders can monitor their screens and freely enter bids or offers, which are then communicated to the host exchange.

The host exchange generally offers many tradeable objects to trade. As used herein, the term "tradeable object," refers simply to anything that can be traded with a quantity and/or price. It includes, but is not limited to, all types of tradeable events, goods, and financial products. For instance, stocks, options, bonds, futures, currency, and warrants, as well as funds, derivatives and collections of the foregoing, and all types of commodities, such as grains, energy, and metals may be considered tradeable objects. A tradeable object may be "real," such as products that are listed by an exchange for trading, or "synthetic," such as a combination of real products that is created by the user. A tradeable object could actually be a combination of other tradeable objects, such as a class of tradeable objects.

For each tradeable object, the host exchange generally provides information to interested parties on how the tradeable object is traded at the exchange. Included in this information are the types of messages that can be communicated with the host exchange. At one level, the host exchange provides information on the message headers, payload, and trailers necessary to interface the exchange. Beyond that, the host exchange provides information on how to open a connection, obtain market information, add an order, change an order, delete an order, close a connection, and so on. The information provided by a host exchange can be as simple or complex as the exchange deems necessary to offer its particular tradeable objects for trade.

Each trading network or trading station is then provided with the same sort of information from the host exchange in its data feed. At each trading station is application software that is run to collect certain pieces of information from this data feed and it is displayed to the trader. From this display, a trader may view this information and make decisions on whether to enter an order, modify an order, or perform some other trading related operation. Sometimes the decisions regarding a trader's particular trading strategy are performed by a computer itself given initial instruction by the trader.

Sometimes, on their machines, traders use trading tools that automatically or semi-automatically send orders to the exchange. Such trading tools are usually provided to, among other things; facilitate fast and accurate order entry. For instance, an automated tool might quickly calculate one or more order parameters, such as order price or order quantity, based on market conditions, or some other reference condition, and then automatically or semi-automatically send an order with these parameters to an exchange for matching. And according to many existing and popular exchanges today, orders are electronically entered in an exchange order book in the sequence in which they are entered into the market (e.g., a first-in, first-out, or FIFO matching system). Based on this sequence, and the availability of market quantity, orders are filled, with priority given to the first order entered, then the second (next) order entered, and so forth.

Using a conventional automated or semi-automated tool, however, when the condition for which the order parameter was based on changes, the trading tool must usually calculate the order parameter and then move or re-price the order in the exchange order book to a new price associated with the new order parameter. As a result, the original order position in the exchange order book is lost and the trader might also be charged a fee each time the order is moved or re-priced in the market. Therefore, for the same reason that automated or semi-automated trading tools make desirable trading tools (e.g., they can rapidly fire orders and/or order changes into the market to capture market opportunities before the competition), such tools can also make undesirable trading tools because, among other things, they can quickly consume network bandwidth, loss of queue position and they can lead to a significant increase in exchange related fees.

In such an electronic marketplace, it becomes desirable to offer tools for use with an automated or semi-automated trading tool.

BRIEF DESCRIPTION OF DRAWINGS

Many aspects of the present embodiments may be better understood with reference to the following drawings. The components in the drawings are not necessarily to scale, emphasis instead being placed upon illustrating example embodiments.

DETAILED DESCRIPTION

I. Overview

Figure 1:
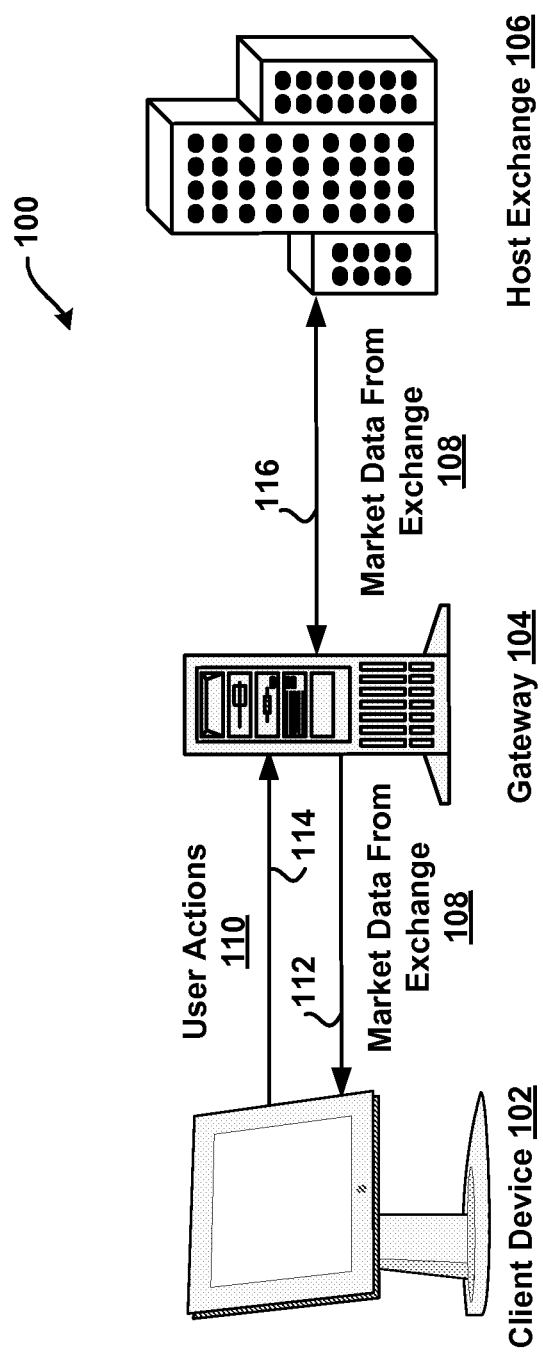
FIG. 1 is a block diagram illustrating an example network configuration for a communication system utilized to access one or more electronic exchanges.

In electronic trading, a trader may trade one or more tradeable objects at any given time. There are all sorts of ways to place orders to buy or sell these tradeable objects. For instance, the trader might place an order through the display screen of a trading station, set up an automated or semi-automated trading tool that can enter an order according to the trader's predefined instruction, or set parameters that would be associated with one or more spread orders.

There are tools to regulate certain types of order entry. For instance, U.S. patent application Ser. No. 10/137,979, now U.S. Pat. No. 7,437,325, entitled, "System and Method for Performing Automatic Spread Trading," provides a mechanism for regulating order entry, referred to as "slop." Slop, among other things, allows a trader to input certain parameters that are used to determine whether an order should be placed in the market. Building off that concept, U.S. patent application Ser. No. 10/403,333, entitled, "System and Method for Variably Regulating Automatic Order Entry in an Electronic Trading System," provides advanced features to variably regulate the order entry process. While these concepts are described more in the present application, the entire contents of each application, namely application Ser. No. 10/137,979 and application Ser. No. 10/403,333, are incorporated herein by reference.

Generally, once programmed, automated or semi-automated trading tools that regulate order entry may often do so with or without the trader's notice of its action. This is because the trader may predefine the parameters in advance of the action actually taking place. The present application describes various example embodiments that can be employed by trading tools, particularly those that use slop or slop-type concepts, to effectively modify slop parameters associated with one or more particularly defined spread orders. A trader can create different adjustable ranges and set different slop parameters for each individual spread order (or a group of selected spread orders) for the same spread. For example, a trader may want one order to quote at a different range than another order, or a trader may want an individual order to re-price more aggressively than other individual orders in a given slop range, such as an order in the leg of the spread, more of which is described below.

The example embodiments may be used in manual-style or automatic-style trading by effectively assisting the trader in regulating orders. Regardless of whether the trading tool is manual or automatic in nature, the example embodiments can effectively increase usability of an order regulatory feature found in a trading tool.

While the example embodiments are described herein with reference to illustrative embodiments for particular applications, it should be understood that the example embodiments are not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. Hardware and Software Overview

As will be appreciated by one of ordinary skill in the art, the example embodiments may be operated in an entirely software embodiment, in an entirely hardware embodiment, or in a combination thereof. However, for sake of illustration, the example embodiments are described in a software-based embodiment, which is executed on a computer device. As such, the example embodiments take the form of a computer program product that is stored on a computer readable storage medium and is executed by a suitable instruction system in the computer device. Any suitable computer readable medium may be utilized including hard disks, CD-ROMs, optical storage devices, or magnetic storage devices, for example.

FIG. 1 is a block diagram illustrating an example system 100 that can be used to facilitate communication between an electronic exchange and a client device. The system 100 includes a client device 102, gateway 104, and host exchange 106. System 100 also includes a plurality of communication links 112, 114, and 116 between the client device 102, gateway 104, and host exchange 106. While FIG. 1 shows two connections between the client device 102 and the gateway 104, it should be understood that a single connection could be used as well. Similarly, one connection could exist between the gateway 104 and the host exchange 106. During a trading session, market data 108, in the form of messages, may be relayed from the host exchange 106 over the communication links 116 and 112 to the client device. As illustrated in FIG. 1, intermediate devices, such as gateway(s) 104, may be used to facilitate communications between the client device 102 and the host exchange 106. It should be understood that while FIG. 1 illustrates the client device 102 communicating with a single host exchange 106, in an alternative embodiment, the client device 102 could establish trading sessions to more than one host exchange.

The market data 108 contains information that characterizes the tradeable object's order book including, among other parameters, order related parameters, such as price and quantity, and the inside market, which represents the lowest sell price (also referred to as the best or lowest ask price), and the highest buy price (also referred to as the best or highest bid price). In some electronic markets, market data may also include market depth, which generally refers to quantities available for trading the tradeable object at certain buy price levels and quantities available for trading the tradeable object at certain sell price levels.

In addition to providing the tradeable object's order book information, electronic exchanges can offer different types of market information such as total traded quantity for each price level, opening price, last traded price, last traded quantity, closing price, or order fill information. It should be understood that market information provided from an electronic exchange could include more or fewer items depending on the type of tradeable object or the type of exchange. Also, it should be understood that the messages provided in the market data 108 may vary in size depending on the content carried by them, and the software at the receiving end may be programmed to understand the messages and to act out certain operations.

A trader may view the information provided from an exchange via one or more specialized trading screens created by software running on the client device 102. Upon viewing the market information or a portion thereof, a trader may wish to take actions, such as send orders to an exchange, cancel orders at the exchange, or change order parameters, for example. To do so, the trader may input various commands or signals into the client device 102. Upon receiving one or more commands or signals from the trader, the client device 102 may generate messages that reflect the actions taken, generally shown at 110. It should be understood that different types of messages or order types can be submitted to the host exchange 106, all of which may be considered various types of transaction information. Once generated, user action messages 110 may be sent from the client device 102 to the host exchange over communication links 114 and 116.

The client device 102 may use software that creates specialized interactive trading screens on the client device 102. The trading screens enable traders to enter and execute orders, obtain market quotes, and monitor positions while implementing various trading strategies including those previously used on the floor of an exchange. Such strategies incorporated into an electronic marketplace can improve the speed, accuracy, and ultimately the profitability of trading electronically. One such trading strategy is spread trading.

The range and quality of features available to the trader on his or her trading screen varies according to the specific software application being run. In addition to or in place of the interactive trading screens, the client device 102 may run automated non-interactive types of trading applications.

A commercially available trading application that allows a user to trade in environments like those shown in FIG. 1 and subsequent figures is X_TRADER® from Trading Technologies International, Inc. of Chicago, Ill. X_TRADER® also provides an electronic trading interface, referred to as MD Trader™, in which desired orders and bid/ask quantities are displayed in association with a static price axis or scale. Portions of the X_TRADER® and the MD Trader™-style display are described in U.S. Pat. No. 6,772,132 entitled "Click Based Trading With Intuitive Grid Display of Market Depth," filed on Jun. 9, 2000, U.S. patent application Ser. No. 09/971,087, now U.S. Pat. No. 7,127,424, entitled "Click Based Trading With Intuitive Grid Display of Market Depth and Price Consolidation," filed on Oct. 5, 2001, and U.S. patent application Ser. No. 10/125,894, now U.S. Pat. No. 7,389,268, entitled "Trading Tools for Electronic Trading," filed on Apr. 19, 2002, the contents of each are incorporated herein by reference. While it may be preferred to employ an MD Trader™ type screen, a person of ordinary skill in the art will recognize that the example embodiments described herein are not limited to any particular type of trading application.

III. Spread Trading Overview

The example embodiments are described with particular reference to spread trading and trading tools that can assist a trader in spread trading. However, as pointed out earlier, the present invention is not limited for use with an automated spread trading tool, but may be applied to any particular trading tool that has an order entry system where limiting the frequency at which orders are placed or re-priced in the market based on a condition, such as the inside market price or last traded quantity, may be beneficial. For instance, another type of trading tool that has an automated order entry system and may benefit using the preferred embodiments is described in U.S. patent application Ser. No. 10/284,584, filed on Oct. 31, 2002 and entitled, "System and Method for Automated Trading," the contents of which are incorporated herein by reference. One skilled in the art may readily adapt the example embodiments to work with this type of automated trading tool, for instance, or some other type of trading tool using the teachings described herein.

To assist in understanding how an automated spread trading tool might work, a general description is provided below. However, an automated spread trading tool and its functions are described in greater detail and may be referenced in an already incorporated U.S. patent application Ser. No. 10/137,979, filed on May 3, 2002, now U.S. Pat. No. 7,437,325, and entitled, "System and Method for Performing Automatic Spread Trading."

According to the example embodiments, a trader selects the individual tradeable objects underlying the spread, referred to herein as the "legs" of the spread. Generally, a "spread" is the purchase or sale of one or more tradeable objects and an associated purchase or sale of one or more other tradeable objects, in the expectation that the price relationships will change so that subsequent offsetting trades potentially yield a net profit.

Figure 2:
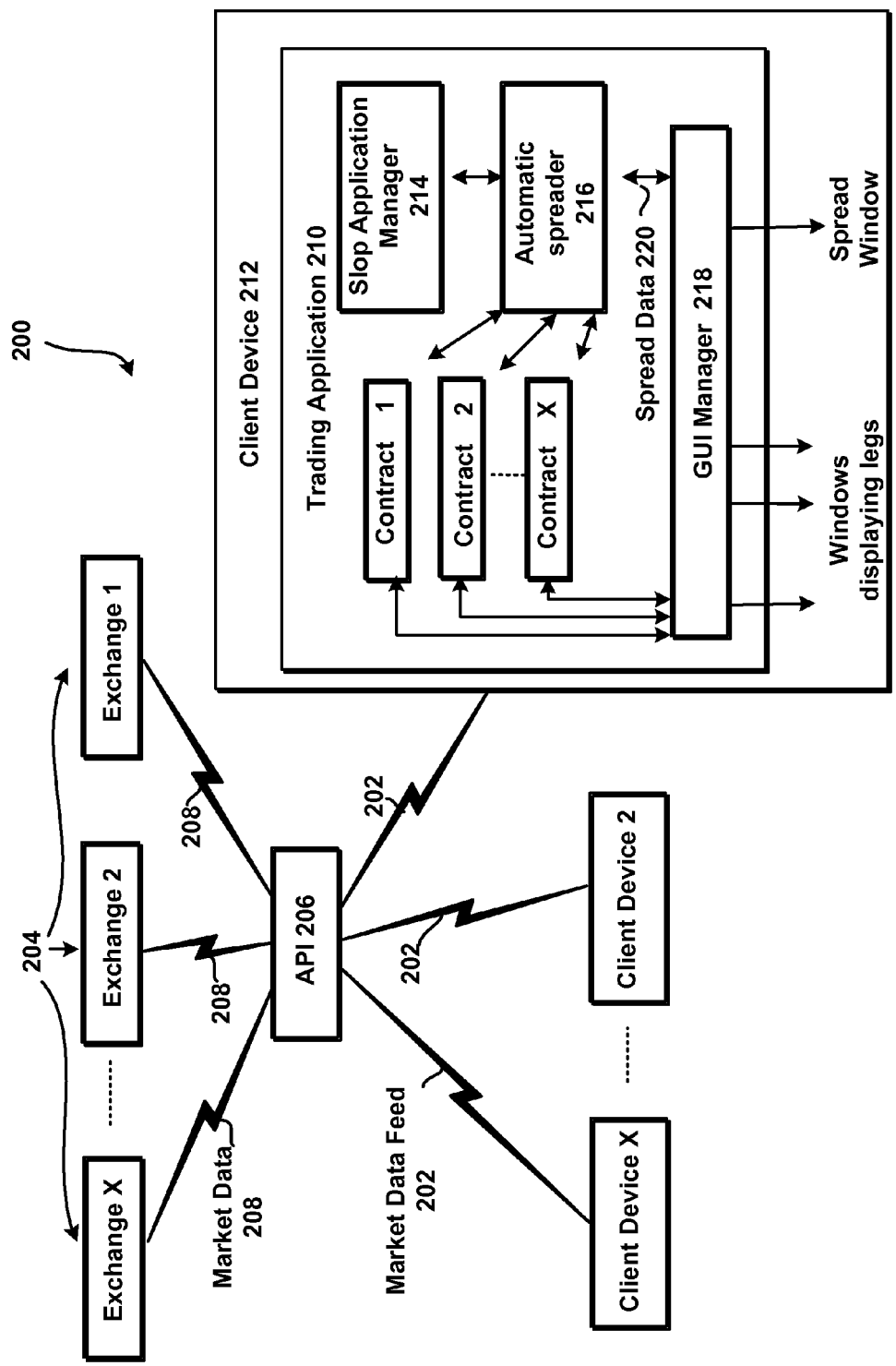
FIG. 2 is a block diagram illustrating a system for facilitating the automatic trading of spreads over the example network shown in FIG. 1 according to an example embodiment.

An automated spread trading application, referred to herein as the automatic spreader, generates spread data based on information in the legs and based on spread setting parameters, which are configurable by the trader. The spread data is communicated to a graphical user interface ("GUI manager" 218 as shown in FIG. 2) where it is displayed in a spread window. The spread window could also display data related to each leg of the spread. The data related to each leg of the spread may also be displayed in separate windows from the spread window. At the client device, the trader can enter orders in the spread window, and the automatic spreader will automatically work the legs to achieve (or attempt to achieve) the desired spread. It should be understood that those skilled in the art of trading are familiar with a wide variety of spread trading techniques, and the present embodiments are not limited to any particular type of spread trading technique.

FIG. 2 is a block diagram illustrating an example system 200 for facilitating the automatic trading of spreads. The system 200 includes an applications program interface ("API") 206 that translates market data 208 for one or more tradeable objects to an appropriate data format, referred to as market data feed(s) 202, which are communicated between the different exchanges and trading applications hosted on the client devices. Client devices may be computing devices such as personal computers, laptop computers, hand-held devices, and so forth. The system 200 preferably supports a plurality of exchanges and client devices.

A client device 212 is shown in more detail to illustrate the interaction between its software and/or hardware components. The client device 212 includes a trading application 210, a slop application manager 214, an automatic spreader 216, and a GUI manager 218. While only four components are shown, it should be understood that the client device 212 could include additional components as well. In one example embodiment, the trading application 210 and the automatic spreader 216 are software applications hosted on the client device 212. Although the automatic spreader 216 is shown together with the trading application 210, it should be understood that the automatic spreader 216 and the trading application 210 may be the same software application or separate software applications on the same or different terminals. Alternatively, the automatic spreader 216 and/or the trading application 210 can be hosted on a server and accessed by the client devices 212 over a network.

In one example embodiment, a trader can configure the automatic spreader 216 to use slop functionality. Slop is used as a means of regulating order entry that can occur in the individual legs of a desired spread order in the automatic spreader 216. Two example types of slop are basic slop and advanced slop, which will be described in greater detail below. The slop application manager 214 can be configured to directly communicate with the automatic spreader 216. Alternatively, the slop application manager 214 could be included in the automatic spreader 216. As will be described in greater detail below, the slop application manager 214 can be configured by the user to have a plurality of inside and outside slop values, also known as the acceptable slop ranges, which are used to determine when an order should be re-priced. The GUI manager 218 is a software application, as shown in FIG. 2, but preferably may work with hardware components such as an input device like a mouse, keyboard, or touch screen, and an output device like a monitor, for example.

In general, as shown in FIG. 2, market data feeds (for tradeable objects) are communicated from the API 206 to the trading application 210 where they are stored and continuously updated (or periodically updated). Using some or all of the market data feeds and the spread setting parameters, the automatic spreader 216 generates spread data 220. The spread data 220 preferably includes spread price, and spread market depth, but may alternatively include other items of interest to the user such as the last traded price (LTP) and the last traded quantity (LTQ). The spread data 220 is communicated to the GUI manager 218 where it can be displayed in a spread window and traded.

Figure 3:
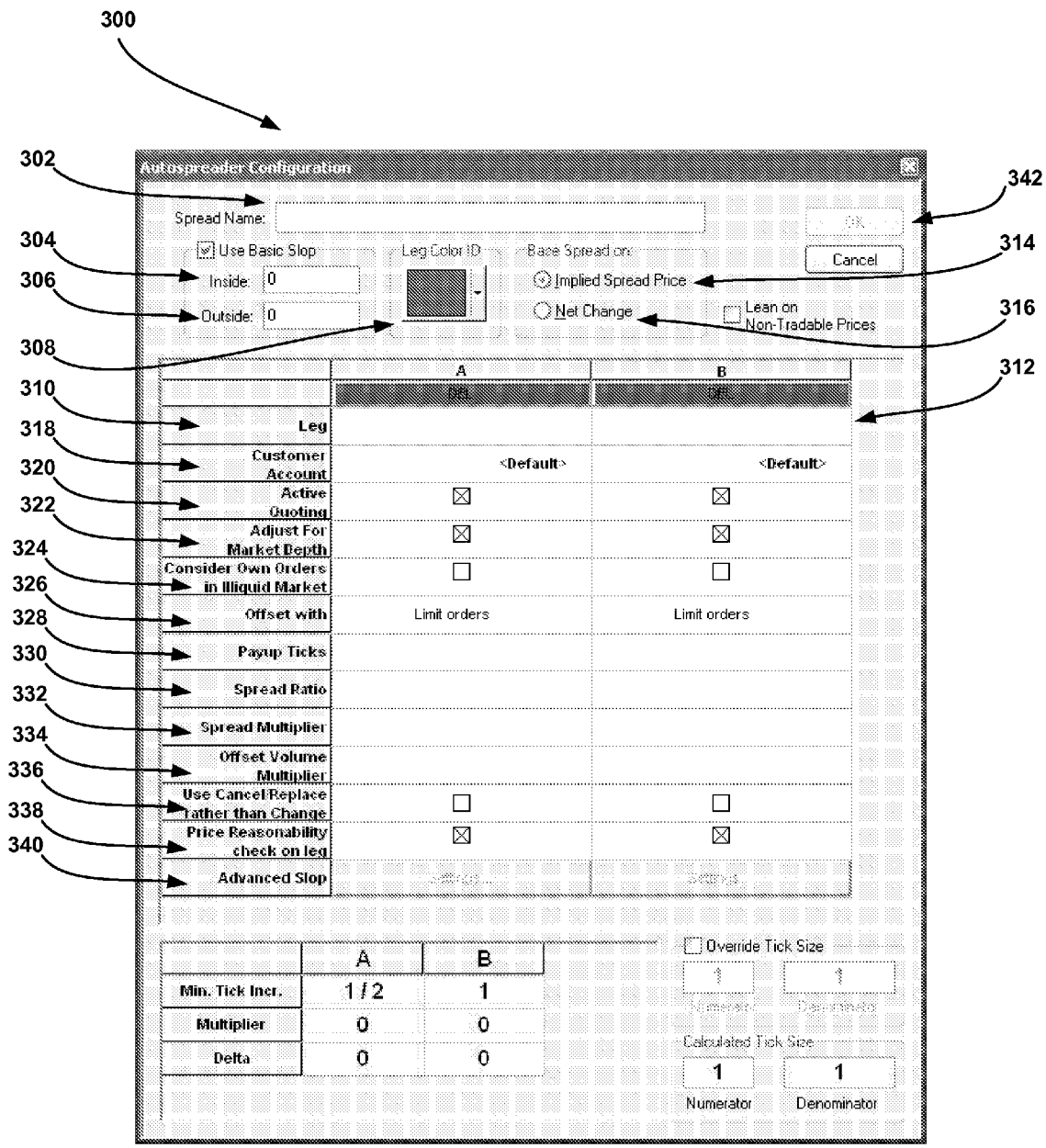
FIG. 3 is a block diagram illustrating an example spread configuration window utilized in accordance with the example system shown in FIG. 2.

Before a trader starts trading, the trader may configure spread parameters to be used by the automatic spreader 216. FIG. 3 is a block diagram illustrating an example spread configuration window 300 that can be used to configure spread parameters for trading spreads. The spread configuration window 300 includes two individual legs 310 and 312 respectively, although any number of legs may be added to the spread configuration window 300. In one example embodiment, the spread configuration window 300 includes many spread parameters that can be set by a trader to customize the spread data feed. As such, the spread parameters may control the behavior of the spread as it is generated and/or displayed and/or traded, depending on the particular parameter. An example list of spread parameters is provided here. The "Spread Name" 302 provides the name of the spread and/or the names of the underlying tradeable objects. Moreover, the names of the legs are displayed in the "Leg" fields 310 and 312. Alternatively, a trader can personalize the spread by renaming the spread and/or legs to have any desired name. Other parameters include "Inside Slop" 304, "Outside Slop" 306, "Leg Color ID" 308, "Implied Spread Price" 314, "Net Change" 316, "Customer Account" 318, "Active Quoting" 320, "Adjust for Market Depth" 322, "Consider Own Orders in Illiquid Market" 324, "Offset with" 326, "Payup Ticks" 328, "Spread Ratio" 330, "Spread Multiplier" 332, "Offset Volume Multiplier" 334, "Use Cancel/Replace rather than Change" 336, "Price Reasonability check on leg" 338, and "Advanced Slop" 340. A trader may select "OK" 342 when the spread has been configured to open a spread window and individual leg windows. It will be appreciated by those skilled in the art that the parameters above may be flexible and/or change as circumstances dictate because of the wide range of products that can be traded using the automatic spreader. Moreover, the columns of the spread configuration window 300 can be dragged and dropped such that the user can rearrange the order of the legs. In addition to the discussed parameters, the spread configuration window 300 could also display a selection icon that could be used to choose one or more tradeable objects to apply the slop settings to. For example the slop could be applied to a spread, an individual leg of a spread, or a specific spread order.

IV. Basic Slop Overview

Generally, slop is used as a mechanism for controlling the rate at which the working leg orders of a spread are changed in the outright markets. Slop may be used to avoid excessive quoting that can result in the assessment of transaction fees by certain exchanges. It is also helpful when maintaining a position in the order queue at an electronic exchange. The implementation of slop results in the creation of a price range above and below a desired spread price at which a trader is willing to be filled. Basic Slop configuration uses one level of inside and outside slop to determine when to re-price the quoted outright legs based upon movement in the market.

The inside and outside slop values are understood to be the acceptable price range set by the trader. The inside slop value generally defines the worst prices (the highest in the case of the spread bid and the lowest in the case of a spread offer) a trader is willing to accept for a spread or the spread order, and the outside slop generally defines the best price (the lowest in the case of a spread bid and the highest in the case of a spread offer) the trader is willing to accept for a spread or the spread order. A slop value of "0" indicates that the legs will be re-quoted every time the market prices in the individual legs move. The larger the slop value, the larger the slop range will be. Larger slop values allow for more market fluctuation before the automatic spreader re-quotes the legs. It should be understood that the slop value can also be based on a trader-configured equation.

i) Basic Slop Example

Figure 4:
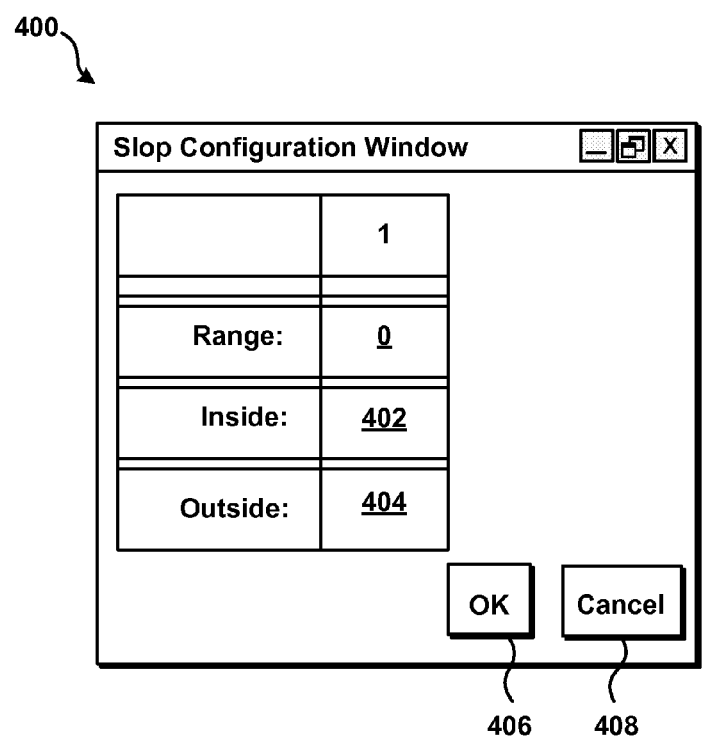
FIG. 4 is a block diagram illustrating an example basic slop configuration window.

Referring back to FIG. 3, using the spread configuration window 300, a trader may activate basic slop for that spread and input the inside and outside slop parameters at 304 and 306, respectively. Another way to activate basic slop is to select Slop button 340 which will activate the slop configuration window 400 shown in FIG. 4. FIG. 4 is a block diagram illustrating an example basic slop configuration window 400 that can be used to configure basic slop parameters. The basic slop configuration window 400 can be used to define the values for the basic slop parameters, inside and outside slop, using fields 402 and 404, respectively. The defined values can be used in relation to the spread or the individual legs of the spread or yet in relation to a specific spread order, as will be described below. Icons 406 and 408 are used to accept or cancel changes made to the values in the slop configuration window 400.

Figure 5:
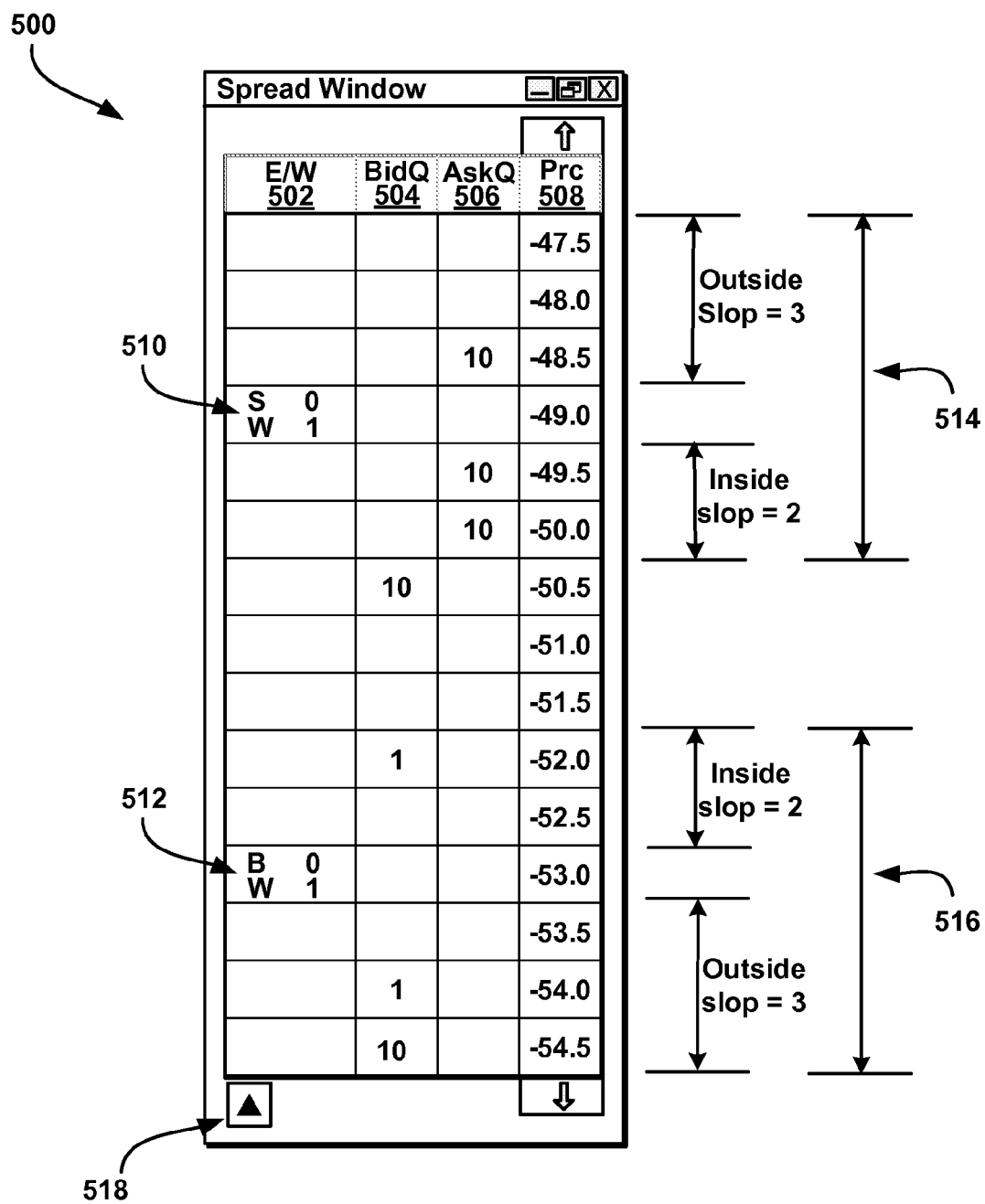
FIG. 5 is a block diagram illustrating an example spread window configured to use basic slop.

FIG. 5 is a block diagram illustrating an example spread window 500 configured with basic slop parameters. Spread window 500 displays a working quantity column "E/W" 502, bid quantity column "BidQ" 504, ask quantity column "AskQ" 506, price column "Prc" 508, spread offer order indicator 510, spread bid order indicator 512, acceptable slop range 514, acceptable slop range 516, and slop icon 518. The working quantity column "E/W" 502 displays desired orders to buy or sell the spread. The bid quantity column "BidQ" 504 displays buy order quantities associated with the price levels in price column "Prc" 508. The ask quantity column "AskQ" 506 displays offer order quantities associated with the price levels in price column "Prc" 508. The price column "Prc" 508 shows price levels in one tick increments (prices can be positive or negative). The spread offer order indicator 510 shows the location where the trader placed a spread offer order. Likewise, the spread bid order indicator 512 shows the location where the trader placed a spread bid order. Acceptable slop range 514 displays the range of acceptable slop prices for the spread offer order at 510. Similarly, the acceptable slop range 516 displays the range of acceptable slop prices for the spread bid order at 512. The slop icon 518 shows if slop is activated or not. By selecting the slop icon 518, a trader may activate or inactivate slop.

According to the example embodiments, prices displayed in the price column "Prc" 508, can be static. As the market conditions change, the order quantities in the bid quantity column "BidQ" 504 and the ask quantity column "AskQ" 506 can dynamically move relative to the price column "Prc" 508 so that a trader can quickly tell if the market has moved up or down in value. Locations of the bid and ask cells along the price column "Prc" 508 are fixed in relation to the price levels. For example, the location corresponding to the current best ask quantity is fixed to the current best ask price of -"51.0", so that as the inside market goes up or down, the trader can quickly view this change. A trader could also reposition the market along the price column "Prc" 508. Upon repositioning, the locations corresponding to the quantities will become fixed in relation to a new set of price levels. It should be understood that re-positioning of the market information may occur automatically or manually. Also, it should be understood that the locations of the price column "Prc" 508 and the bid quantity column "BidQ" 504 and ask quantity column "AskQ" 506 are not fixed, and the columns could be rearranged. For example, the price column "Prc" 508 could be displayed horizontally or yet at some other angle.

To assist in understanding how quantities move in relation to prices, a general description is provided in already incorporated U.S. Pat. No. 6,772,132, entitled "Click Based Trading with Intuitive Grid Display of Market Depth," filed on Jun. 9, 2000.

Spread window 500 assumes that a trader has a desired spread offer order 510 at a price of "-49.0" and a desired spread bid order 512 at a price of "-53.0". Assuming that this example involves the two leg spread as defined in FIG. 3, the spread bid corresponds to a bid in a first leg and an offer in a second leg. Similarly, the spread offer corresponds to an offer in the first leg and a bid in the second leg. Let's assume that a trader used the slop configuration window 400 of FIG. 4 to set the inside slop value to "2" and the outside slop value to "3". Based on the slop settings, the acceptable slop range for the desired spread offer order 510 would be between "-47.5" and "-50.0", as shown at 514. Similarly, the acceptable slop range for the desired spread bid order 512 would be between "-52.0" and "-54.5", as shown at 516. According to this example, the desired spread acceptable range values can be calculated as follows:

1 price level=0.5

For the spread offer order at 510: Inner Price=-49.0-2 price levels=-50.0

Outer Price=-49.0+3 price levels=-47.5

For the spread bid order at 512: Inner Price=-53.0+2 price levels=-52.0

Outer Price=-53.0-3 price levels=-54.5

V. Advanced Slop Overview

Rather than setting a single range of inside and outside slop parameters for each leg of the spread, such as described in the Basic Slop Overview section, with respect to basic slop, a trader could set more than one range of inside and outside slop parameters and adjustable range parameters. The concept of using more than one range of inside and outside slop parameters will be referred to hereinafter as "advanced slop".

According to advanced slop, a trader can define inside slop, outside slop, and adjustable range parameters. An adjustable range is defined as a plurality of ranges, with each range being associated with a set of inside and outside slop parameters. When a spread order is entered at a price level within a defined adjustable range, then a set of inside and outside slop parameters associated with that adjustable range will be used to evaluate whether a leg order should be moved or re-priced to maintain the desired spread order price. Likewise, if a spread order is entered at a price level associated with another adjustable range, then the set of inside and outside slop parameters corresponding to the other range will be used to evaluate whether a leg order should be moved or re-priced to maintain the desired spread order price. By using advanced slop, a trader could variably and more flexibly control order entry of trading systems, and in particular, automated or semi-automated trading tools. A more detailed description of re-pricing and advanced slop functionality is provided in an already incorporated U.S. patent application Ser. No. 10/403,333, filed on Mar. 31, 2003 and entitled "System and Method for Variably Regulating Automatic Order Entry in an Electronic Trading System."

Figure 6:
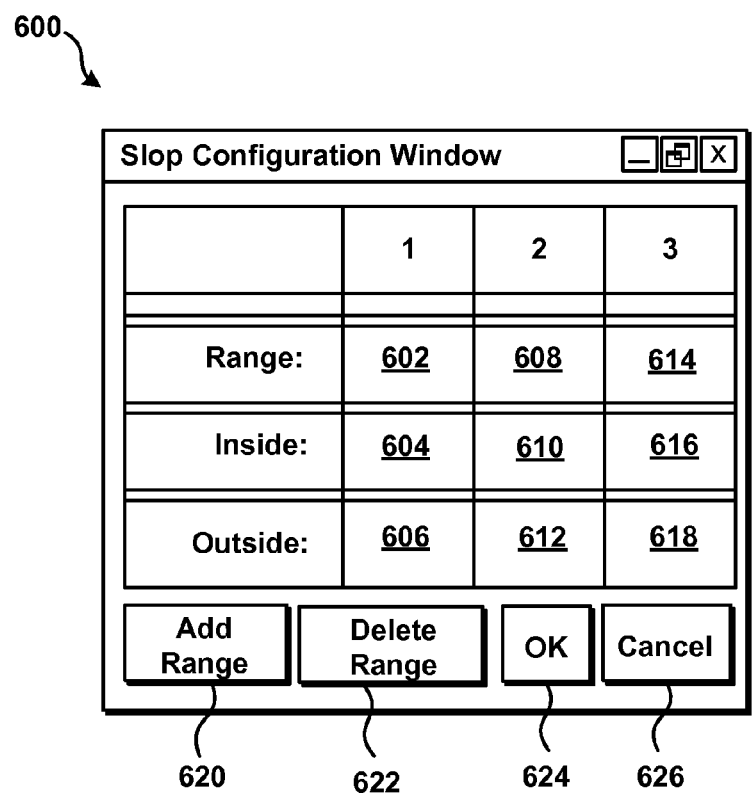
FIG. 6 is a block diagram illustrating an example advanced slop configuration window.

FIG. 6 is a block diagram illustrating an example advanced slop configuration window 600 that can be used to configure advanced slop parameters. The advanced slop configuration window 600 can be used to define the values for inside slop and outside slop in relation to a plurality of one or more adjustable ranges. Slop configuration window 600 displays one example set of parameters that could be defined for advanced slop. In particular, slop configuration window 600 displays three ranges (although one or more ranges may appear, if so programmed) and their corresponding inside slop parameters, outside slop parameters, and adjustable range parameters. The parameters in slop configuration window 600 can be used in relation to both buy spread orders and sell spread orders. However, alternatively, different ranges could be defined for buy and sell spread orders. When a desired spread order falls within a configured range, then that range's inside and outside slop parameters are preferably used to evaluate whether a leg order should be moved or re-priced to maintain the desired spread order price.

According to slop configuration window 600, there are three ranges 602, 608, and 614, although any number of ranges could be defined based on trader preferences. For example, only one range might be used, or only two ranges, or four ranges, and so on. Also, either an inside slop or outside slop parameter may be used, if so desired. Range 602 has an inside slop parameter and an outside slop parameter that can be specified using fields 604 and 606, respectively. Range 608 has inside slop and outside slop parameters that can be specified using fields 610 and 612. Then, range 614 has inside slop and outside slop parameters that can be specified using fields 616 and 618. If the trader wants to add an additional range, he or she can select icon 620. If the trader wants to delete a range, he or she can select the range and select icon 622. Icons 624 and 626 are used to accept or cancel changes.

Referring to FIG. 6, if a trader wanted the first adjustable range to encompass four price levels from the best bid and best offer, the trader could select the range 1 parameter 602 and enter a value of 0. Then, in the range 2 parameter 608, the trader could enter a value of "4", thus creating the first adjustable range, range 1, "$0 \leq X < 4$". Any buy or sell spread order entered in range 1 would then use inside and outside slop parameters 604 and 606, respectively. Alternatively, as mentioned above, different slop values could be defined for buy and sell orders.

A trader may wish to set one or more ranges of inside and outside slop parameters and one or more adjustable ranges. Once the trader has configured one range, slop configuration window 600 shown in FIG. 6 can be used to configure a second range. If the trader wants the second adjustable range to encompass four price levels past the first configured adjustable range, the trader could select the field 614 and enter a value of "8". Entering a value of "8" in the range 3 parameter would thus create the second adjustable range, range 2, "4≤X<8". Any buy or sell spread order entered in range 2 would then use inside and outside slop parameters 610 and 612, respectively.

Since there are only three ranges defined in this example embodiment, the value defined in the field 614 can be used as a starting point of range 3, with range 3 being "8≤X<∞". Any buy or sell spread order entered in range 3 would then use inside and outside slop parameters 616 and 618, respectively.

Alternatively, the ranges could correspond to integer price levels. For example, for any buy spread orders, range 1 might include integer price levels "−50, −51, −52, −53, and −54" rather than tick levels used directly above. For any sell spread orders, range 1 might include integer price levels "−50, −49, −48, −47, and −46". The example embodiments may utilize any unit of measure to define the ranges and therefore the example embodiments are not limited to the increments used or described herein.

According to one embodiment, the ranges for buy spread orders preferably start from the best offer, and the ranges for the sell spread orders preferably start from the best bid. Moreover, the buy side ranges could start from the best bid or some other designated reference point (e.g., the best offer, last traded price (LTP), last traded quantity (LTQ), a theoretical price, or some other reference point), and the sell side ranges could start from the best offer or some other designated reference point (e.g., the best bid, last traded price (LTP), last traded quantity (LTQ), a theoretical price, or some other reference point). Therefore, it should be understood that the example embodiments are not limited to where a range starts and ends or what price levels a range is referenced from.

i) Advanced Slop Example

Figure 7:
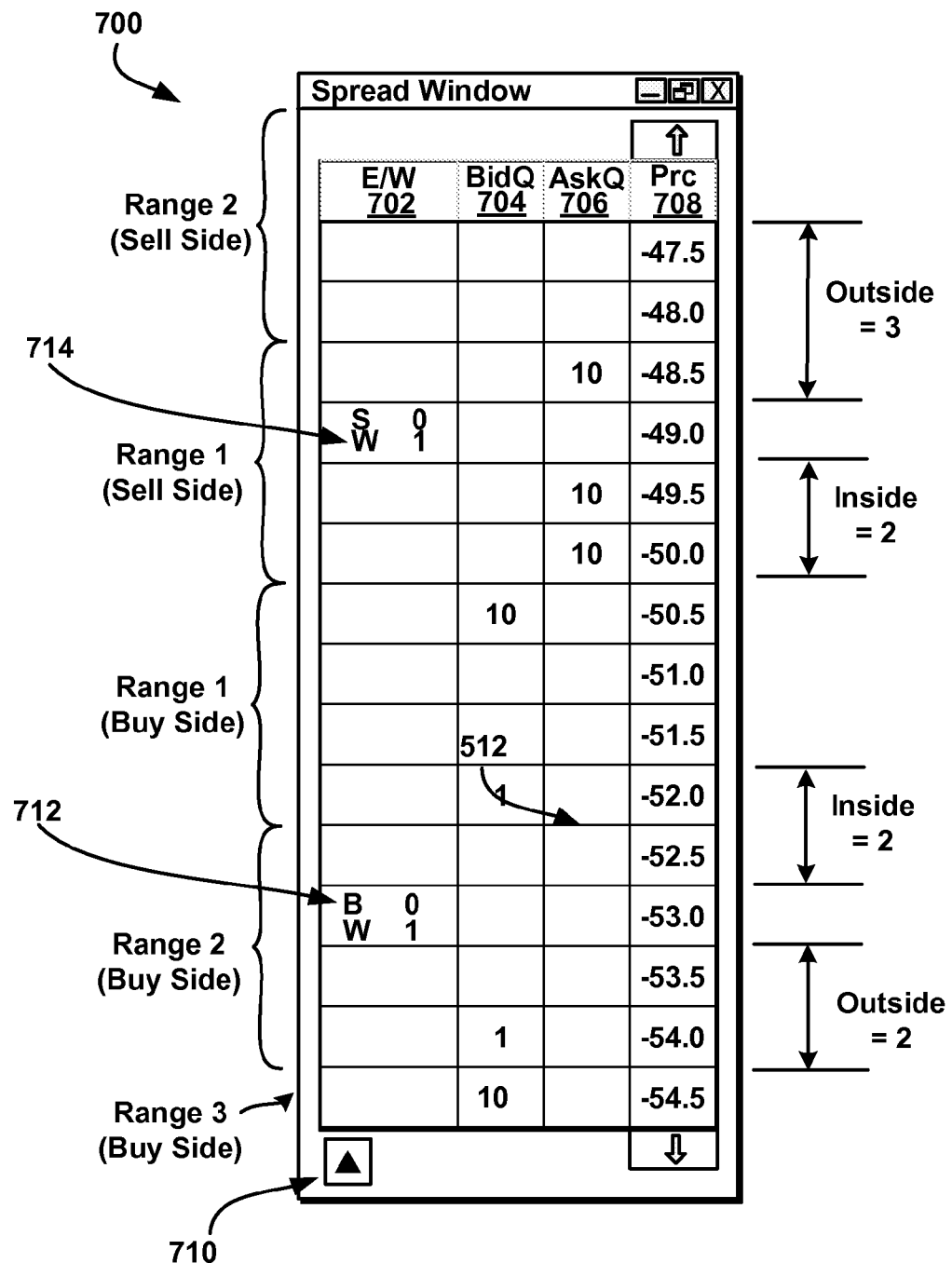
FIG. 7 is a block diagram illustrating an example spread window configured to use advanced slop.

FIG. 7 is a block diagram illustrating an example spread window 700 configured for advanced slop. The display 700 shows a working quantity column "E/W" 702, bid quantity column "BidQ" 704, ask quantity column "AskQ" 706, price column "Prc" 708, Slop Icon 710, spread bid order indicator 712, and spread offer order indicator 714. The working quantity column "E/W" 702 displays desired orders to buy or sell tradeable objects. The bid quantity column "BidQ" 704 displays bid quantities associated with the price levels in price column "Prc" 708. The ask quantity column "AskQ" 706 displays ask quantities associated with the price levels in price column "Prc" 708. The price column "Prc" 708 shows price levels in one tick increments (prices can be positive or negative). The slop icon 710 shows if slop is activated or not. By selecting the icon, a trader may activate slop or inactivate slop. The spread bid order indicator 712 shows the location where the trader placed a spread bid order. Likewise, the spread offer order indicator 714 shows the location where the trader placed a spread offer order.

FIG. 7 shows a plurality of range levels determined based on a slop range definition described in reference to FIG. 6. The ranges are shown using brackets for ease of illustration. As previously described, if a desired spread order price falls within one of the ranges, then the parameters corresponding to that range apply. For any buy spread orders, range 1, "0≤X<4" corresponds to price levels "−50.5, −51.0, −51.5, and −52.0". Note that some other price unit may be used instead of 0.5 increments. Similarly, for any sell spread orders, range 1, "0≤X<4", corresponds to price levels or "−50.0, −49.5, −49.0, and −48.5". For any buy spread orders, range 2, "4 X<8", corresponds to price levels "−52.5, −53.0, −53.5, and −54.0". For any sell spread orders, range 2, "4×<8", corresponds to price levels "−48.0, −47.5, −47.0, and −46.5". For any buy spread orders, range 3, "8≤X<∞", corresponds to price levels "−54.5, −55.0, −55.5, −60.0", and so on. For any sell spread orders, range 3, "8≤X<∞", corresponds to price levels "−46.0, −45.5, −45.0", and so on.

Accordingly, the sell spread order at price "−49.0", falls in one of the price levels in range 1. Range 1, as defined in FIG. 6, is associated with the inside slop parameter value of "2" and with the outside slop value of "3". The defined slop values would then be used in relation to the spread order at the price of "−49.0". Likewise, the buy spread order at price "−53.0", falls in one of the price levels in range 2. Let's assume that a trader also used the slop configuration window 600 of FIG. 6 to set the inside slop value of "2" and outside slop value of "2" in relation to Range 2.

VI. Slop Parameters Associated with an Order

As previously described in detail, the two types of slop, basic and advanced, can be applied to the spread or to an individual spread leg involved in the spread. It may be advantageous, however, for a trader to apply basic slop and/or advanced slop parameters to an individual order (or a group of selected orders). For example, a trader may be able set the slop parameters associated one or more selected spread orders, such that one spread order may be achieved faster than another spread order. Additionally, a trader might want to modify the slop parameters associated with one or more selected spread orders so that the leg orders associated with the selected spread order are re-priced more or less aggressively than other leg orders. Further, alternatively, a trader might simply want one or more spread orders to have more restrictive slop parameters than other spread orders within the same adjustable range.

The ability to customize inside slop, outside slop, and/or adjustable range parameters to an individual spread order allows a trader to more efficiently manage their desired orders and modify settings so that specific orders can, for example, have different slop parameters than another spread order.

In one example embodiment, a trader can place an order in the spread window and then either activate or deactivate slop in relation to that order from the spread window 500 shown in FIG. 5 or spread window 700 shown in FIG. 7 by selecting icon 518 or 710 respectively. Alternatively, slop can be activated or deactivated using the spread configuration window 300 shown in FIG. 3 and the slop configuration window 600 shown in FIG. 6 prior to a trader placing an order in the spread window. Once slop has been activated, the trader can select a specific spread order icon and modify the inside slop, outside slop, and/or adjustable range parameters associated with the spread order to the trader's desired slop parameters. The method of modifying the slop parameters using such method will be described with respect to FIG. 8. A trader could also set the inside slop, outside slop, and/or adjustable range parameters associated with the spread order prior to placing the order in the spread window and then activate slop to apply the parameters to the placed order.

To modify the inside slop and outside slop parameters from the spread window 500 shown in FIG. 5, the trader may select the specific spread order for modification. Once the spread order is selected, the slop configuration window 400 shown in FIG. 4 can be activated and a trader can modify the slop parameters associated with that spread order. As described above, the basic slop configuration window 400 can be used to define the values for the basic slop parameters, inside and outside slop, using fields 402 and 404, respectively, associated with the spread order. Icons 406 and 408 can then be used to accept or cancel changes made to the values in the slop configuration window 400.

To assist in understanding how basic slop and advanced slop parameters can be modified and displayed, a general description is provided in U.S. patent application Ser. No. 11/095,101, filed on Mar. 31, 2005 and entitled "Visual Representation and Configuration of Trading Strategies," now U.S. Pat. No. 7,590,576, the contents of which are incorporated herein by reference.

It should be understood that rather than applying and modifying slop parameters associated with a single spread order, a trader can select a group of spread orders and apply slop parameters to the group of selected spread orders. Likewise, a trader can apply slop parameters and then place a group of orders in the market that will be associated with the slop parameters.

Figure 8:
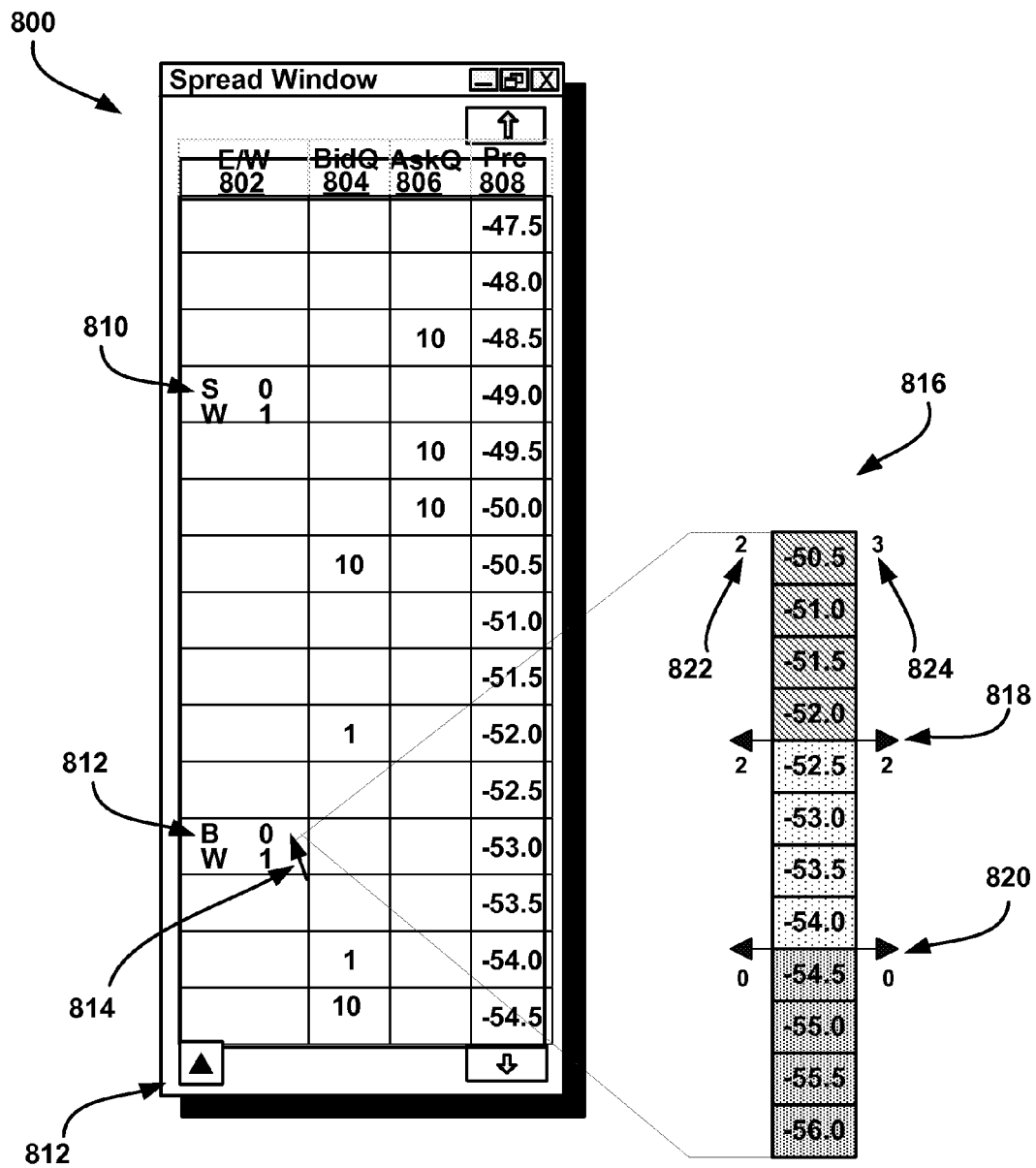
FIG. 8 is a block diagram illustrating an example spread window configured to use basic and/or advanced slop and an example interactive range window to be used to modify basic or advanced slop parameters associated with an individual spread order as shown in FIG. 7.

Additionally, in another example embodiment, a trader can apply and modify advanced slop by first selecting a spread order as described above. FIG. 8 is a block diagram illustrating a spread window 800 configured for advanced slop and an interactive range window 816 for use in modifying adjustable range parameters and slop parameters for a specific spread order. Spread window 800 displays a working quantity column "E/W" 802, bid quantity column "BidQ" 804, ask quantity column "AskQ" 806, price column "Prc" 808, spread offer order 810, spread bid order 812, and mouse cursor 814, operated by an input device, and slop icon 816. The working quantity column "E/W" 802 displays working orders to buy or sell the spread. The bid quantity column "BidQ" 804 displays buy order quantities associated with the price levels in price column "Prc" 808. The ask quantity column "AskQ" 806 displays offer order quantities associated with the price levels in price column "Prc" 808. The price column "Prc" 808 shows price levels in one tick increments (prices can be positive or negative). One spread offer order, at price "−49.0", is shown at 810 in the working quantity column "E/W" 802. One spread bid order, at price "−53.0", is shown at 812 in the working quantity column "E/W" 802. By right, left, or middle clicking the mouse cursor 814 operated by an input device, on the spread bid order at price "−53.0" shown at 812, a trader can activate an interactive range window 816. Alternatively, a trader could select slop icon 816 to activate the interactive range window 816. The interactive range window 816 can be used to modify the advanced slop parameters associated with that specific spread bid order at price "−53.0" shown at 812.

In the present embodiment, a trader can activate the interactive range window 816 by right, left, or middle clicking within the region of the spread bid order 812 using the mouse cursor 814, operated by an input device. Preferably, the interactive range window 816 is displayed in such a way that it does not interfere with the spread window 800 or with the trader's ability to view market activity or spread order movements. The trader can modify the inside slop, outside slop, and/or adjustable range values associated with the spread bid order at price "−53.0" shown at 812 and then quickly resume trading in the spread window without any distraction.

Interactive range window 816 can be used to modify the adjustable range parameters associated with a spread order. From the interactive range window 816, a trader can also activate a slop configuration window to modify inside and outside slop parameters associated with the spread order, which will be described in FIG. 9. In the example embodiment, the interactive range window 816 displays the ranges of prices associated with the selected spread order. It should be understood that the ranges of prices associated with the spread order can be displayed in a variety of ways. For example, the ranges of prices could be displayed vertically, horizontally, or at an angle. It should also be understood that the display is not limited to displaying prices. For example, price level increments or tick values could also be shown.

In this example, the prices are ordered in the same manner as those in the price column "Prc" 808 shown in spread window 800. As described above, the adjustable ranges begin at the best bid, "−50.5", and proceed along the price column accordingly. By selecting a spread bid order, the interactive range window will display the ranges associated with the bid side of the market, as shown in interactive range window 818. Interactive range window 816 also displays range dividers 818 and 820, and an inside slop or outside slop value indicator 822 and 824, respectively.

The range dividers 818 and 820 separate each trader-configured adjustable range for the spread bid order. As previously described, the adjustable ranges were applied in the spread configuration window 300 shown in FIG. 3 and the slop configuration window 600 shown in FIG. 6. The interactive range window 816 displays range 1, which is defined from price "−50.5" to range divider 818 or price "−52.0". For any bid spread orders, range 1, "0≤X<4" corresponds to price levels "−50.5, −51.0, −51.5, and −52.0". Range 2 is defined from range divider 818 or price "−52.0" to range divider 820 or price "−54.0". For any bid spread orders, range 2, "4≤X<8", corresponds to price levels "−52.5, −53.0, −53.5, and −54.0". And range 3 is defined from range divider 820 or price "−54.0 to ∞". For any buy spread orders, range 3, "8≤X<∞", corresponds to price levels "−54.5, −55.0, −55.5, −60.0", and so on. For any sell spread orders, range 3, "8x<∞", corresponds to price levels "−46.5, −46.0, −45.5, −45.0", and so on. It should be understood that just as there can be any number of adjustable ranges defined in the slop configuration window, there can also be any number of range dividers displayed in the interactive range window. Additionally, a trader can similarly add and/or delete range dividers depending on their desired slop settings for the spread order.

The interactive range window 816 also displays inside and outside slop values in relation to each adjustable range. For example, the inside slop value corresponding to range 1 is shown at 822. Likewise, the outside slop value corresponding to range 1 is shown at 824. The inside slop value associated with range 1 is a value of "2" and the outside slop value associated with range 1 is a value of "3". In the embodiment of FIG. 8, the inside slop and outside slop are shown on the opposite side of the interactive range window 816. However, different displays are possible as well.

To modify an adjustable range that is associated with a spread order, a trader can use the mouse cursor 814 to select a portion of the range dividers 818 or 820 and drag the range divider to a desired price level along the interactive range window 816. For example, to increase the number of price levels in range 2, a trader could drag range divider 820 down towards price level "−54.5". Similarly, to decrease the number of price levels in range 1, a trader could drag range divider 818 up towards price level "−51.5". As previously described in detail, the example embodiments are not limited to where a range starts and ends or what price levels a range is referenced from. The adjustable ranges for the ask side and the bid side can be independent of each other and could be modified independently of each other. The example embodiments are also not limited to increasing and decreasing the number or price levels in a range. The ranges could shift to a different range of price levels while maintaining the number of price levels within the range.

In an alternative embodiment, range dividers 818 and 820, could be displayed on the price column "Prc" 808 instead of being displayed in the interactive range window 816. Similarly, the trader could use the same method of selecting a range divider to increase, decrease, modify, or shift the adjustable ranges associated with a spread order.

Figure 9:
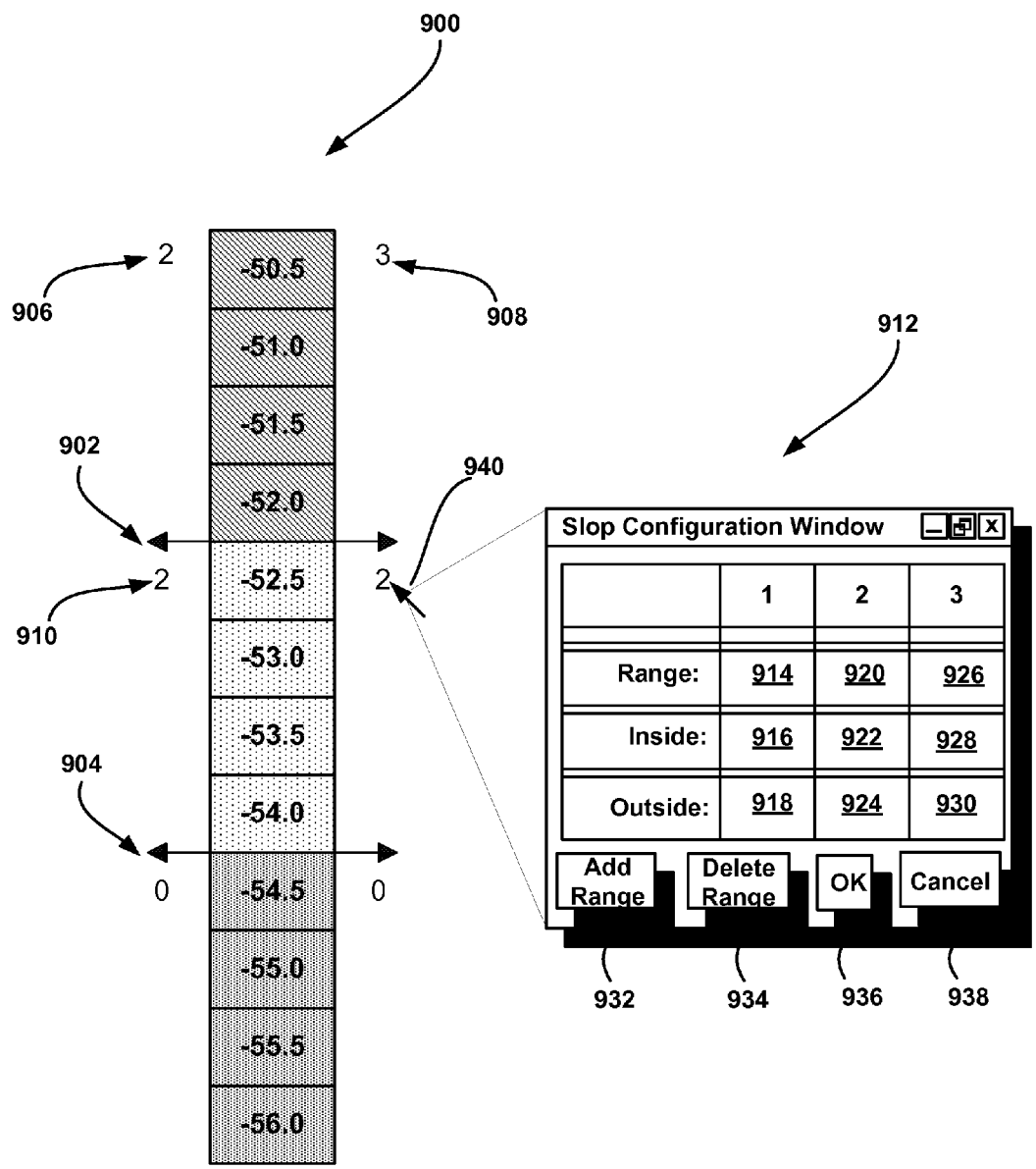
FIG. 9 is a block diagram illustrating an example interactive range window and a slop configuration window to be used to modify basic and/or advanced slop parameters associated with an individual spread order as shown in FIG. 7.

In another example embodiment, a trader could modify the inside slop, outside slop, and/or adjustable range parameters associated with each range for a spread order via the interactive range window as shown in FIG. 9. FIG. 9 is a block diagram illustrating the interactive range window 900. The display 900 shows range dividers 902 and 904, and inside and outside slop value indicators 906, 908, and 910. As previously described, the interactive range window displays inside slop and outside slop values in relation to each adjustable range. For example, the inside slop and outside slop values corresponding to range 1 are shown at 906 and 908. Likewise, the inside slop value corresponding to range 2 is shown at 910. The inside slop value associated with range 1 is a value of "2" and the outside slop value associated with range 1 is a value of "3". Similarly, the inside slop value associated with range 2 is a value of "2". A slop value indicator is not associated with range 3 because inside and outside slop values were not configured for range 3, thus two "0" inside slop and outside slop values are displayed in relation to range 3. A slop value of 0 indicates that the legs will be re-quoted every time the market prices in the individual legs move. The larger the slop value, the larger the slop range will be. Larger slop values allow for more market fluctuation before the automatic spreader re-quotes the legs.

FIG. 9 also illustrates an example method of activating the slop configuration window 912, via the interactive range window 900. The display 912 shows adjustable ranges 914, 920, 926, inside slop parameters 916, 922, 928, outside slop parameters 918, 924, 930, add a range icon 932, delete a range 934, accept modifications icon 936, cancel modifications icon 938, and mouse cursor 940 operated by an trader input device. According to the slop configuration window shown in FIG. 9, there are three ranges 914, 920, and 926 although any number of ranges could be defined based on trader preferences. Also, either inside or outside slop parameters may be used, if so desired.

Range 914 has an inside slop parameter and an outside slop parameter that can be specified using fields 916, 918, respectively. Range 920 has inside slop and outside slop parameters that can be specified using fields 922, 924. Then, range 926 has inside slop and outside slop parameters that can be specified using fields 928, 930. If the trader wants to add an additional range, the trader can select icon 932. If the trader wants to delete a range, the trader can select the range and select icon 934. Icons 936 and 938 are used to accept or cancel changes. The mouse cursor 940, operated by a trader input device, shows that a trader can right, left, or middle click to activate the slop configuration window 912 from the interactive range window 900.

Modifying the inside slop, outside slop, and/or adjustable range values associated with an individual spread order, a spread, or an individual leg of a spread can be accomplished via the slop configuration window 912. Once a trader is satisfied with modifications to the values in the slop configuration window 912 and the interactive range window 900, the trader can select the OK Icon 936 to close the slop configuration window 912 and simply click on the spread window 800 to close the interactive range window 900. As an alternative, modifying the inside slop, outside slop, and/or adjustable range values could be done from the interactive range window 900 without the need to activate the slop configuration window 912.

Figure 10:
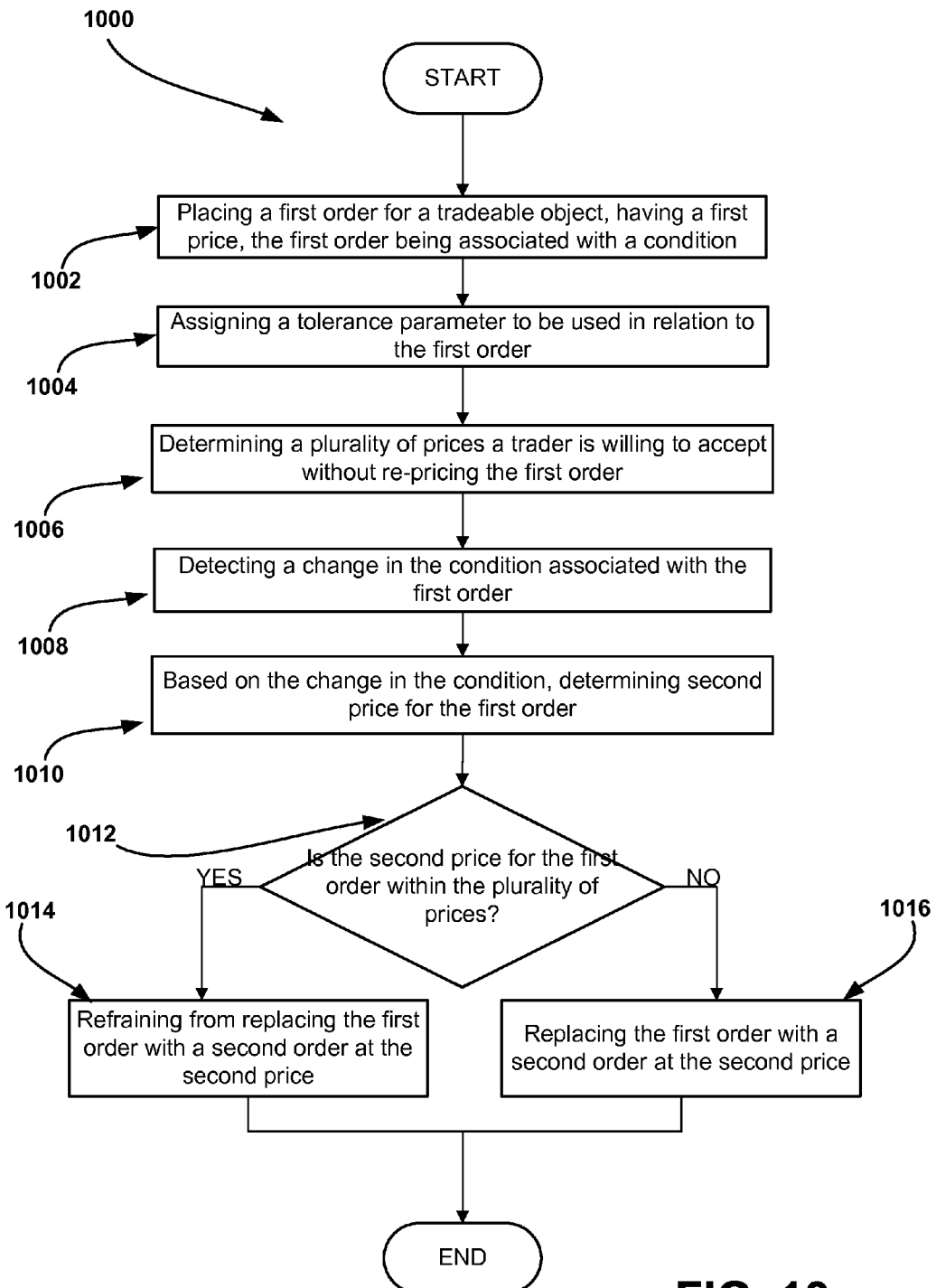
FIG. 10 is a flow chart illustrating an example embodiment of a method for applying and modifying slop parameters market information for an individual spread order or a group of spread orders.

FIG. 10 is a flow chart illustrating an example method for applying and modifying slop parameters market information for an individual spread order which might be carried out by the example system 200 shown in FIG. 2. Each block in FIG. 10 may represent a module, segment, or portion of code, which includes one or more executable instructions for implementing specific logical functions or steps in the process. Alternate implementations are included within the scope of the preferred embodiments in which functions may be executed out of order from that shown or discussed, including substantially concurrently or in reverse order, depending on the functionality involved, as would be understood upon reading this description by those of skill in the art.

At block 1002 the trader can place a first order for a tradeable object, having a first price, the first order being associated with a conditional event. For example, the first order can be a spread order, and a trader can place the spread order using the spread window 800 shown in FIG. 8. As shown at block 1004, the trader can assign a tolerance parameter to be used in relation to the first order. According to one example embodiment, a trader could select an order indicator corresponding to the first order, and then assign the tolerance parameter to the first order. In relation to the spread order, a tolerance parameter can be inside slop, outside slop, and/or adjustable range parameters or the combination thereof. However, different tolerance parameters could also be used in relation to orders other than spread orders. Interactive range window 900 and the slop configuration window 912 describe example methods that can be used to assign the inside slop, outside slop, and/or adjustable range parameters in relation to the first order. At block 1006, using the tolerance parameter, the trading application determines a plurality of prices the trader is willing to accept without re-pricing the first order. At block 1008, the trading application detects if there is a change in the conditional event associated with the first order. At block, 1010, based on the change in the conditional event associated with the first order, a second price is determined for the first order. At block 1012, the trading application determines if the second price is within the plurality of prices. At block 1014, if the second price is within the plurality of prices, the trading application refrains from replacing the first order with a second order at the second price. At block 1016, if the second price is not within the plurality of prices, the trading application will replace the first order with a second order at the second price.

CONCLUSION

The above description of the example embodiments, alternative embodiments, and specific examples, are given by way of illustration and should not be viewed as limiting. Also, many changes and modifications within the scope of the present embodiments may be made without departing from the spirit thereof, and the present invention includes such changes and modifications.

It will be apparent to those of ordinary skill in the art that methods involved in the system and method for defining inside slop, outside slop, and/or adjustable ranges in relation to a spread order may be embodied in a computer program product that includes one or more computer readable media. For example, a computer readable medium can include a readable memory device, such as a hard drive device, a CD- ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A system including:
   a computing device,
   wherein the computing device is configured to receive a selection command to select a group of strategy orders, wherein the group of strategy orders is a subset of a plurality of strategy orders for a trading strategy, wherein the trading strategy is specified by a definition and includes a first leg and a second leg, wherein the first leg corresponds to a first tradeable object and the second leg corresponds to a second tradeable object, wherein each strategy order in the group of strategy orders is associated with a desired strategy price and a first leg order at a first price for the first tradeable object, wherein the first price of the first leg order of each strategy order in the group of strategy orders is determined according to the definition for the trading strategy based on the desired strategy price of the strategy order and market data for the second tradeable object;
   wherein the computing device is configured to receive a parameter command, wherein the parameter command includes a tolerance parameter;
   wherein the computing device is configured to assign the tolerance parameter to each strategy order in the group of strategy orders in response to receiving the parameter command; and
   wherein the computing device is configured to work the first leg order of each of the strategy orders in the group of strategy orders according to the definition for the trading strategy based on the desired strategy price of the strategy order, the market data for the second tradeable object, and the tolerance parameter assigned to the strategy order.

2. The system of claim 1, wherein the trading strategy is a spread.

3. The system of claim 1, wherein a first strategy order in the group of strategy orders is associated with an old tolerance parameter, wherein the first price of the first leg order for the first strategy order is determined further based on the old tolerance parameter, wherein the assigned tolerance parameter replaces the old tolerance parameter.

4. The system of claim 3, wherein the old tolerance parameter is a default tolerance parameter.

5. The system of claim 1, wherein the selection command and the parameter command are part of a single command.

6. The system of claim 1, wherein the tolerance parameter includes at least one of an inside slop value and an outside slop value.

7. The system of claim 1,
   wherein the computing device is configured to receive a deactivate command to deactivate the working of the first leg order of each of the strategy orders in the group of strategy orders based on the tolerance parameter; and
   wherein the computing device is configured to working the first leg order of each of the strategy orders in the group of strategy orders without respect to the tolerance parameter in response to receiving the deactivate command.

8. The system of claim 1,
   wherein the computing device is configured to receive a second parameter command, wherein the second parameter command includes a second tolerance parameter;
   wherein the computing device is configured to assign the second tolerance parameter to each strategy order in the group of strategy orders in response to receiving the second parameter command; and
   wherein the computing device is configured to work the first leg order of each of the strategy orders in the group of strategy orders based on the second tolerance parameter instead of the tolerance parameter.

9. The system of claim 1, wherein the computing device includes a client device.

10. The system of claim 9, wherein the client device provides a trading screen to a user.

11. The system of claim 1, wherein the computing device includes a server.

* * * * *